US005944461A

United States Patent [19]

Kanbar

[11] Patent Number: 5,944,461

[45] Date of Patent: Aug. 31, 1999

[54] POSTAGE METER YIELDING BAR CODED POSTAGE LABELS

[76] Inventor: Maurice S. Kanbar, 2140 Pacific Ave. Apt. #503, San Francisco, Calif. 94115

[21] Appl. No.: 08/854,385

[22] Filed: May 12, 1997

[51] Int. Cl.$^{6}$ .......... G06K 15/00

[52] U.S. Cl. .......... 408/705

[58] Field of Search .......... 705/408, 401, 705/402, 403, 400; 395/108, 101, 114, 115, 116; 364/479.05, 479, 464.02, 200; 83/487, 508, 614, 680, 485, 472, 649, 203, 231, 483, 484, 412, 418; 22/13, 25, 70, 97, 1; 400/247, 82

[56] References Cited

U.S. PATENT DOCUMENTS 5,016,511 5/1991 Dannatt .......... 83/487

5,122,967 6/1992 Gilham .......... 364/479

5,694,526 12/1997 Emmett et al. .......... 395/108

*Primary Examiner*—James P. Trammell

*Assistant Examiner*—Chinor M. Lee

*Attorney, Agent, or Firm*—Michael Ebert

[57] ABSTRACT

A postage meter whose postage supply is a reel of adhesive tape on which is pre-printed a continuous incremental bar code. The amount of postage required for a given piece to be mailed is expressed on a postage label derived from the tape and attachable to the piece in multiple increments whereby the greater the postage amount, the longer the label. Also included in the postage meter is a second reel of blank adhesive tape from which is derived a data label to be applied to the piece on which is meter-printed data appropriate to the mailing, such as the identity the post office from which the piece is mailed and the date of mailing.

5 Claims, 2 Drawing Sheets

POSTAGE METER YIELDING BAR CODED POSTAGE LABELS

BACKGROUND OF INVENTION

1. Field of Invention

This invention relates generally to postage meters adapted to produce an adhesive-backed postage label to be attached to the piece to be mailed, the label indicating the amount of the postage, and more particularly to a postage meter in which the label produced thereby expresses the postage in the form of an incremental bar code, the amount of postage being indicated in multiple code increments.

2. Status of Prior Art

The term postage refers to stamps, labels or printing placed on an item to be mailed, such as an envelope containing a letter, the postage serving as evidence of payment of the charge for mailing the item. Thus if the postage is 25 cents, one adheres on the envelope a 25 cents stamp purchased from a post office. But if instead of using a stamp, use is made of a postage meter, then the meter prints a 25 cents symbol on the envelope or on an adhesive-backed label to be applied to the envelope.

A postage meter is a machine used in bulk mailing to print the amount of postage on each piece of mail either directly on the piece or on a label to be adhered to the piece. In the postage meter disclosed in the Mikhail U.S. Pat. No. 5,098,130, the meter prints on the label not only the postage, but also the name of the post office from which the piece is mailed and the date of mailing.

A standard Pitney Bowes postage meter which is in widespread use throughout the United States, is provided with a single reel of adhesive tape from which a label is derived on which is machine-printed the required postage and data appropriate to the mailing.

The main drawback of a Pitney Bowes postage meter and similar meters in common use is that it is designed to print out a predetermined aggregate amount of postage, say $250 worth of postage. When this postage supply is exhausted, the machine is no longer operative and must be hauled back to a United States Post Office which upon receipt of a $250 payment, then resets the machine so that it can again operate to yield $250 worth of postage, after which the machine must again be brought back to the Post Office for resetting.

The need to return the postage meter to the Post Office whenever its postage supply is exhausted is not the only disadvantage of this meter, for the standard postage meter is not tamper proof and is capable of being illegally reset so as to continuously print out postage labels without making any payment at all to the Post Office.

Of prior art interest is the Durst et al. U.S. Pat. No. 5,239,168 assigned to Pitney Bowes which discloses a postage meter that not only prints out the postage amount, say 32 cents, and the date of mailing, but prints out in bar code form also the zip code of the destination.

The reason for this bar code printout is that the Post Office is equipped with a bar code reader and gives a mailer a discount if the item mailed presents the zip code in bar code form and thereby facilitates mail sorting operations. But a postage meter of this type still has to be returned to the Post Office when its postage supply is exhausted.

The Pusic U.S. Pat. No. 5,065,000 provides a postage meter which prints on a self-adhesive label to be attached to the piece to be mailed a bar code that gives the destination of the piece and other data that can be read by a bar code reader at the Post Office. The Mikhael U.S. Pat. No. 5,098,130 discloses a postage stamp in which the monetary value of the stamp is printed in bar code form to facilitate faster processing and sorting of mail pieces.

It is important that the distinction between a standard bar code symbol and an incremental bar code in accordance with the invention be understood.

A standard bar code is composed of a pattern of bars of different width and spaces therebetween whereby the information supplied by scanning this symbol depends on these differences. Hence a bar code symbol representing a 50 cent stamp would have the same length as a bar code symbol representing a one dollar stamp, but the bars in the 50 cent symbol would differ in their width from those in the one dollar symbol.

An incremental bar code is formed by equi-spaced bars having the same width, the information supplied by scanning this code depending on the number of bars counted. Thus an incremental code representing a one dollar stamp is longer than one representing a 50 cents stamp.

SUMMARY OF INVENTION

In view of the foregoing, the main object of this invention is to provide a postage meter whose postage supply takes the form of a reel of adhesive tape on which is pre-printed a continuous incremental bar code from which is derived a postage label in which the required postage is expressed in multiple increments, the higher the amount of postage, the longer the label.

Among the significant advantages of a postage meter in accordance with the invention are the following:

A. There is no need to return the postage meter to the Post Office when the bar code postage supply reel is exhausted, for all that is necessary is to purchase a fresh reel from the Post Office and install it in the meter.

B. The use of an incremental bar-coded postage supply reel in the meter obviates the possibility of defrauding the Post Office, for the meter cannot produce postage labels unless a postage supply reel is purchased from the Post Office.

C. The bar-coded postage label on the mailed piece may be read by a bar code reader at the Post Office handling the piece to check whether the postage is correct.

D. The bar-coded postage supply reel is difficult to counterfeit.

Also an object of this invention is to provide a postage meter in which in addition to a postage supply reel of bar-coded tape there is included a second reel of blank adhesive tape from which is derived a meter-printed data label to be applied to the piece to be mailed.

Briefly stated, these objects are attained by a postage meter whose postage supply is a reel of adhesive tape on which is pre-printed a continuous incremental bar code. The amount of postage required for a given piece to be mailed is expressed on a postage label derived from the tape-and attachable to the piece in multiple increments whereby the greater the postage amount, the longer the label.

Also included in the postage meter is a second reel of blank adhesive tape from which is derived a meter-printed data label to be applied to the piece on which is printed data appropriate to the mailing, such as the identity of the post office from which the piece is mailed and the date of mailing.

BRIEF DESCRIPTION OF DRAWING

For a better understanding of the invention, as well as further features thereof, reference is made to the detailed description thereof to be read in connection with the annexed drawings wherein.

DETAILED DESCRIPTION OF INVENTION

A postage meter in accordance with the invention has internal mechanisms and associated controls similar to those in existing postage meters adapted to print on a label to be adhered to a mailing piece the required postage as well as appropriate data such as the time of mailing and the location of the Post Office from which the piece is mailed. Hence there is no need to describe these known mechanisms and controls in detail.

Figure 1:
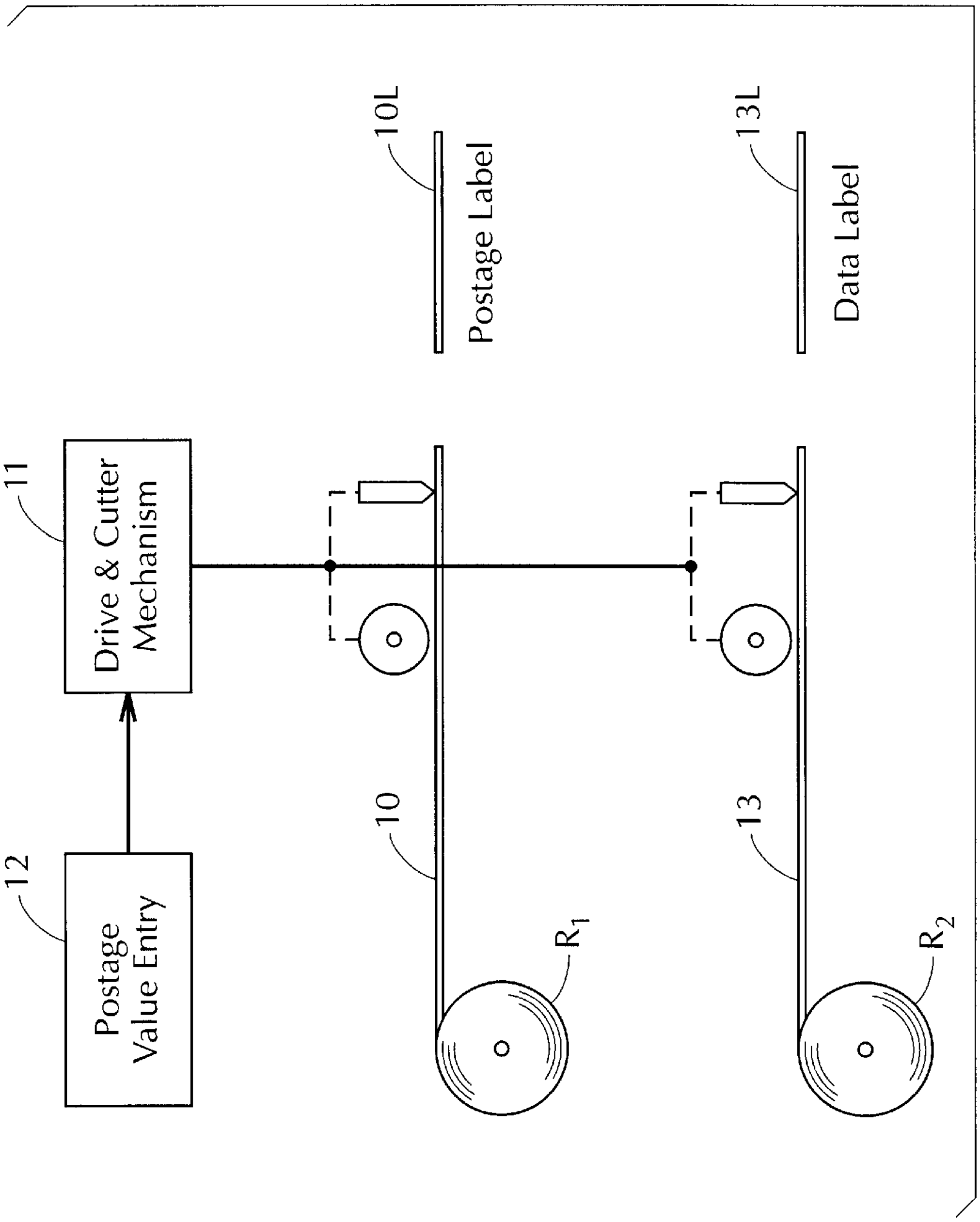
FIG. 1 is a schematic diagram of a postage meter having both a bar-coded postage reel and a data reel in accordance with the invention.

As shown in FIG. 1, included in a postage meter in accordance with the invention is a postage supply in the form of a first reel $R_1$ on which is wound a paper tape 10 having a pressure-sensitive adhesive backing layer on its underside. Tape 10 is drawn from reel $R_1$ by a drive and cutter mechanisms 11 to produce a label 10L to be attached to the piece to be mailed. The drive and cutter mechanism is controlled by a postage monetary value entry board 12. The amount of tape drawn from the reel and the resultant length of the label expresses the monetary value of the postage. Thus a short label may represent 30 cents in postage, and a longer label 60 cents.

Figure 2:
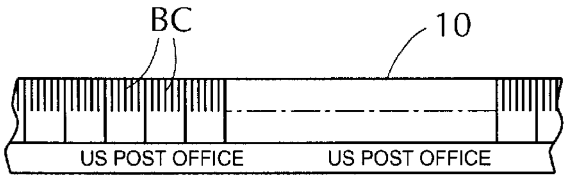
FIG. 2 shows a section of the tape on the postage reel.

As shown in FIG. 2, printed along the full length of tape 10 in reel $R_1$ is a continuous incremental bar code BC formed by an endless series of equi-spaced parallel bars. Each increment in the bar code is made up of a fixed number of bars and has a fixed length, such as 3⁄16 of an inch. This increment is equal to a predetermined unit value of postage, say six cents.

Figure 3:
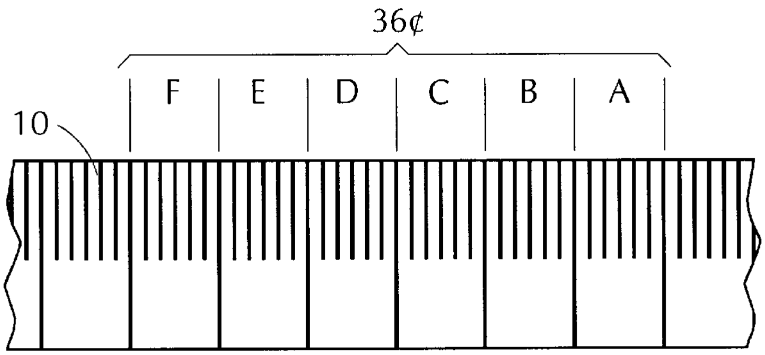
FIG. 3 shows the relationship between the length of the postage tape and the amount of postage.
Figure 4:
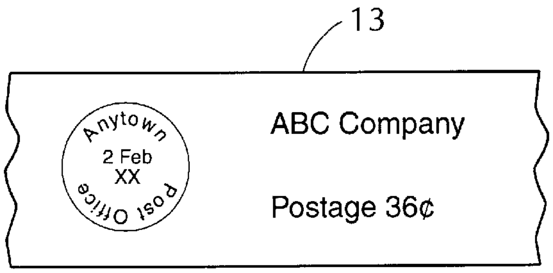
FIG. 4 shows a section of tape on the data reel.

Thus FIG. 3 shows a tape 10 having a series of six increments A to F, each being 3⁄16 of an inch in length. Since each increment has a postage value of six cents, increments A to F, taken together, are worth 36 cents in postage. Hence a bar-code label 10L whose length is equal to six increments represents 36 cents in postage, one whose length is equal to three increments, represents 18 cents of postage, and one whose length is equal to ten increments represents 60 cents in postage. And one whose length is equal to 2–12 increments is worth 15 cents.

Thus the most important feature of a bar code postage meter in accordance with the invention is that when a particular monetary value of postage is entered into the meter in entry device 12, the meter then yields a bar code label 10L whose length is proportional to the entered value—the greater the value, the longer the cut strip of tape which forms the stick-on label.

In practice in order to prevent unauthorized copying of the bar code tape, it may be printed with magnetic bars or by holography so that unless properly printed, it will be rejected at the Post Office by a bar code reader.

Also included in the postage meter is a reel $R_2$ on which is wound a relatively broad blank paper data tape 13 backed by a layer of pressure sensitive adhesive. When drive and cutting mechanism 11 draws tape from reel $R_1$ and cuts the tape to produce a label 10L of the desired length, the same mechanism concurrently draws data tape from reel $R_2$ and cuts it to produce a data label 13L of the same length.

The data tape is meter printed to print on this tape the location 14 of the Post Office and the data of mailing, the name of the company from which the mailing originates, the monetary value of postage, and other data appropriate to the mailing. Since the data tape is relatively broad, it may also have meter-printed thereon company advertisements.

Hence issuing from the postage meter is a bar code postage label 10L and a data label 13L of the same length, the length depending on the monetary value of postage to be applied to the piece to be mailed.

Figure 5:
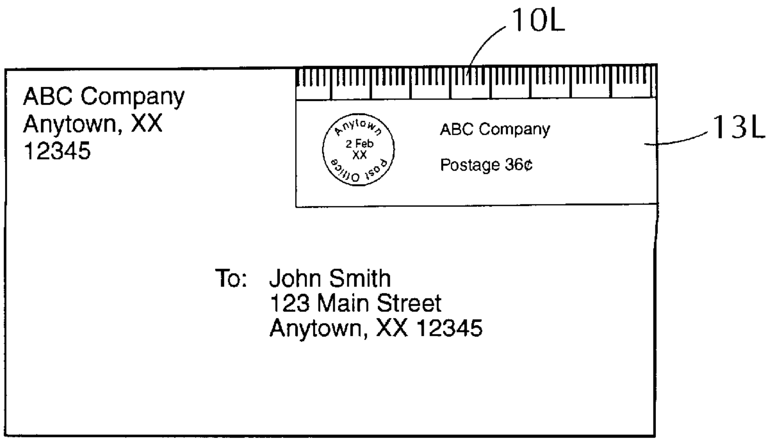
FIG. 5 illustrates an envelope having attached thereto a postage label and a data label in accordance with the invention.

In FIG. 5, the piece is an envelope 16 to which the labels are applied. In practice, the width of the data label may be so broad as to create an upper blank space above the data printed thereon to permit the narrower bar code postage label to be adhered onto this blank space. Thus both labels can be adhered in overlapping relation onto the envelope.

While there has been shown and described a preferred embodiment of a postage meter yielding bar coded postage labels, it will be appreciated that many changes and modifications may be made therein without, however, departing from the essential spirit thereof.

I claim:

1. A postage meter comprising:

A. a reel of adhesive postage tape having pre-printed along its length a continuous incremental bar code, each increment of which represents a unit value of postage, whereby to apply proper postage to a piece to be mailed multiple increments are required;

B. a mechanism to draw and cut from the reel a length of bar code tape to produce a label attachable to the mailing piece having a length encompassing the multiple increments required for the postage;

C. a second reel of blank adhesive tape on which is meter-printed data appropiate to the piece to be mailed, such as the identify of the post office from which the piece is mailed and the data of mailing; and D. means to draw a length of said tape from the second reel to produce a data label to be attached to the mailing piece, the operation of the postage tape being synchronized with that of the data tape to produce postage and data labels of the same length.

2. A postage meter as set forth in claim 1, in which the adhesive is a pressure-sensitive adhesive.

3. A postage meter as set forth in claim 1, in which the incremental bar code is formed by an endless series of equi-spaced bars of the same width.

4. A postage meter as set forth in claim 1, including means to enter into the meter the monetary value of postage to be issued, and to control the mechanism in accordance with the value entered.

5. A postage meter as set forth in claim 1, in which the data tape is broader than the postage tape.

* * * * *